United States Patent
Wahls

(10) Patent No.: US 6,186,467 B1
(45) Date of Patent: Feb. 13, 2001

(54) FULL SEAT ADJUSTABLE SUSPENSION

(75) Inventor: Robert J. Wahls, Pinckney, MI (US)

(73) Assignee: Michigan Seat Company, Jackson, MI (US)

( * ) Notice: Under 35 U.S.C. 154(b), the term of this patent shall be extended for 0 days.

(21) Appl. No.: 09/306,216

(22) Filed: May 6, 1999

(51) Int. Cl.$^7$ .................................................. F16M 13/00
(52) U.S. Cl. ........................ 248/564; 248/577; 248/404; 248/157; 248/161; 248/162.1; 248/188.6
(58) Field of Search .................................. 248/564, 157, 248/161, 404, 623, 188.6, 577, 162.1

(56) References Cited

U.S. PATENT DOCUMENTS

| | | |
|---|---|---|
| 974,769 | 11/1910 | Hoff . |
| 2,531,572 | 11/1950 | Knoedler . |
| 2,840,140 | 6/1958 | Harrington . |
| 3,743,230 | 7/1973 | Freedman . |
| 4,382,573 * | 5/1983 | Aondetto .............................. 248/561 |
| 4,448,386 * | 5/1984 | Moorhouse et al. ................. 248/564 |
| 4,611,783 * | 9/1986 | Sakamoto .............................. 248/588 |
| 4,640,488 * | 2/1987 | Sakamoto .............................. 248/588 |
| 4,687,250 | 8/1987 | Esche . |
| 4,856,763 * | 8/1989 | Brodersen et al. ................... 267/131 |
| 5,176,356 * | 1/1993 | Lorbiecki et al. .................... 248/577 |
| 5,388,801 * | 2/1995 | Edrich et al. ......................... 248/564 |
| 5,580,027 * | 12/1996 | Brodersen ............................. 248/564 |
| 5,601,338 | 2/1997 | Wahls . |
| 5,799,922 * | 9/1998 | Timms et al. ......................... 248/564 |
| 5,957,426 * | 9/1999 | Brodersen ............................. 248/588 |
| 5,984,410 * | 11/1999 | Brodersen ............................. 297/339 |

\* cited by examiner

*Primary Examiner*—Anita M. King
*Assistant Examiner*—A. Joseph Wujciak, III
(74) *Attorney, Agent, or Firm*—Young & Basile, P.C.

(57) ABSTRACT

An adjustable suspension for a vehicle seat mounted on a scissors linkage wherein the spring supporting suspension force may be adjustable over a wide range of user weight, and wherein the scissors linkage permits the seat, which may include a back, to move in a substantially vertical direction during seat suspension movement.

9 Claims, 4 Drawing Sheets

FULL SEAT ADJUSTABLE SUSPENSION

BACKGROUND OF THE INVENTION

1. Field of the Invention

The invention pertains to adjustable seat suspensions, particularly for vehicles, wherein the seat is mounted upon a scissors linkage, and the supporting biasing force for the seat is adjustable over a wide range.

2. Description of the Related Art

Off road equipment such as lift trucks, backhoes, Bobcats, and the like, often utilize a spring supported seat to cushion the driver during vehicle operation. Such cushioning usually utilizes extension or compression springs which support the driver's weight. However, because of variations in the driver's weight, often in excess of 100 pounds, it is difficult to "tune" a spring supported seat suspension to provide optimum comfort. Accordingly, it is known to employ seat suspensions utilizing extension or compression springs wherein the biasing force imposed by the springs on the seat structure is adjustable.

In my U.S. Pat. No. 5,601,338, I disclose a vehicle seat structure with an adjustable suspension of the extension spring type. In this patent, the seat is pivoted at its forward edge, and the rear edge is supported by a pair of extension springs. An adjustably positionable slide located upon a lever arm is interposed between the springs and the seat rear portion wherein adjustment of the slide upon the lever means varies the extent of spring biasing force by changing the location of the application of the biasing force to the lever, and in this manner, the seat disclosed in U.S. Pat. No. 5,601,338 may be adjusted to provide an operative suspension for a wide weight range of vehicle operators.

In U.S. Pat. No. 5,601,338, only the seat bottom is capable of suspension, but in some applications wherein large shocks or impacts are transmitted to the seat structure through the vehicle, it is desirable to have greater support and impact absorption than is possible with the prior art devices.

Further, to achieve maximum comfort in a spring supported seat having a back, it is highly desirable that both the back and seat portions move in unison during suspension, and in the prior art, a full seat adjustable suspension device capable of utilization with a wide range of weights of users has not been readily available.

OBJECTS OF THE INVENTION

It is an object of the invention to provide a full seat adjustable suspension wherein the biasing force provided by springs may be varied over a wide range of adjustment, and both the seat bottom and back are suspended and will operate in unison.

An additional object of the invention is to provide a spring suspended seat using a pair of extension springs to produce an adjustable biasing force on a seat bottom and back wherein the suspension force may be easily adjusted, and the operating mechanism for the seat is simple and dependable in operation.

Yet another object of the invention is to provide a full seat adjustable suspension utilizing scissor or other linkages wherein the seat moves in a vertical direction during suspension, is supported upon extension springs, and adjustment is provided by adjusting the location of the biasing force with respect to a seat supporting lever pivot.

SUMMARY OF THE INVENTION

The seat in accord with the invention includes base structure which is horizontally mounted upon the seat support, usually a vehicle such as a tractor, lift truck, or other piece of industrial equipment. The base structure is normally formed of sheet steel and includes spaced rails having guides adjacent the base front edge, and linkage pivots are defined adjacent the base rear edge. A vertically extending spring support arises from the base at the rear edge thereof having an upper region serving as a support for the seat suspension springs.

A scissors linkage is supported upon the base. This linkage includes a pair of pivotally interconnected levers, each defining a set, and the lower end of one set lever is pivotally connected to the rear portions of the base, while the lower portion of the other lever of each set includes a pivot follower located within a base guide wherein the levers of each linkage set are capable of pivoting to change the angular relationship of the levers of a set to raise and lower the set's pivots axes.

A seat frame includes linear pockets affixed to the seat frame front edge receiving followers affixed to the upper ends of the scissor linkage levers pivotally mounted to the base, and at a location spaced from the pockets' spring biased arms engage the underside of the seat frame to resiliently support the frame. In most cases, the seat frame will include a back rest portion, and the bottom cushion and the back cushion for the seat will be mounted upon the seat frame bottom and seat frame back.

Adjustment of the supporting spring biasing force is through a U-shaped lever whose base is pivotally mounted to the upstanding base structure, and the outer free ends constituting the arms of the lever structure engage the underside of the seat frame wherein an upward force upon the lever arms will tend to raise the seat frame. The lever arms are biased upwardly by a slide adjustably positionable along the length of the arms to which the extension springs are attached at their lower end. The upper end of the extension springs is affixed to the upstanding base mounted spring support upper region.

The slide is adjusted along the lever arms by a cable system operated by an adjusting screw mounted upon the seat frame wherein the operator may quickly locate the slide upon the arms to produce the desired degree of suspension biasing force as determined by the weight of the person to be supported by the seat frame. An indicator permits the slide to be preadjusted as desired.

As the seat frame is mounted upon the scissors linkage, the seat frame suspension movement in a vertical direction is approximately linear providing occupant comfort and expected movement with respect to operating pedals and the like. The fact that the seat back is suspended for movement with the seat bottom provides excellent comfort to the user at all stages of suspension.

A feature of the structure of the invention arises from the fact that the upper end of the scissors lever whose lower end is pivotally and translatably mounted within the base guides is that such linkage upper end is located within a slot defined in the base mounted spring support. This relationship between a scissors linkage lever and the base permits ease of operation of the rather complex linkage structure while imparting to the scissors linkage a rigidity which permits safety seat belts to be affixed to the seat structure, rather than being anchored to the vehicle frame, as is the usual case. Arcuate slots are defined in the base spring anchor structure receiving pivots mounted upon the upper ends of scissors links, and the cooperation of such links' upper ends and the slots provides a high strength mechanical connection permitting seat belts to meet industry requirements while affixed to the seat structure. Such an arrangement is particularly desirable with adjustable seats to prevent the seat belts from imposing discomfort upon the wearer due to horizontal adjustment and vertical movement of the seat structure.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

The basic components of an adjustable seat mechanism in accord with the invention includes base structure 10 upon which the seat frame 12 is mounted. The base structure includes a base plate 14 adapted to be mounted upon the supporting surface of the vehicle or the like, and a pair of parallel rails 16 are affixed to the base plate to permit fore and aft adjustment of the seat structure.

Figure 3:
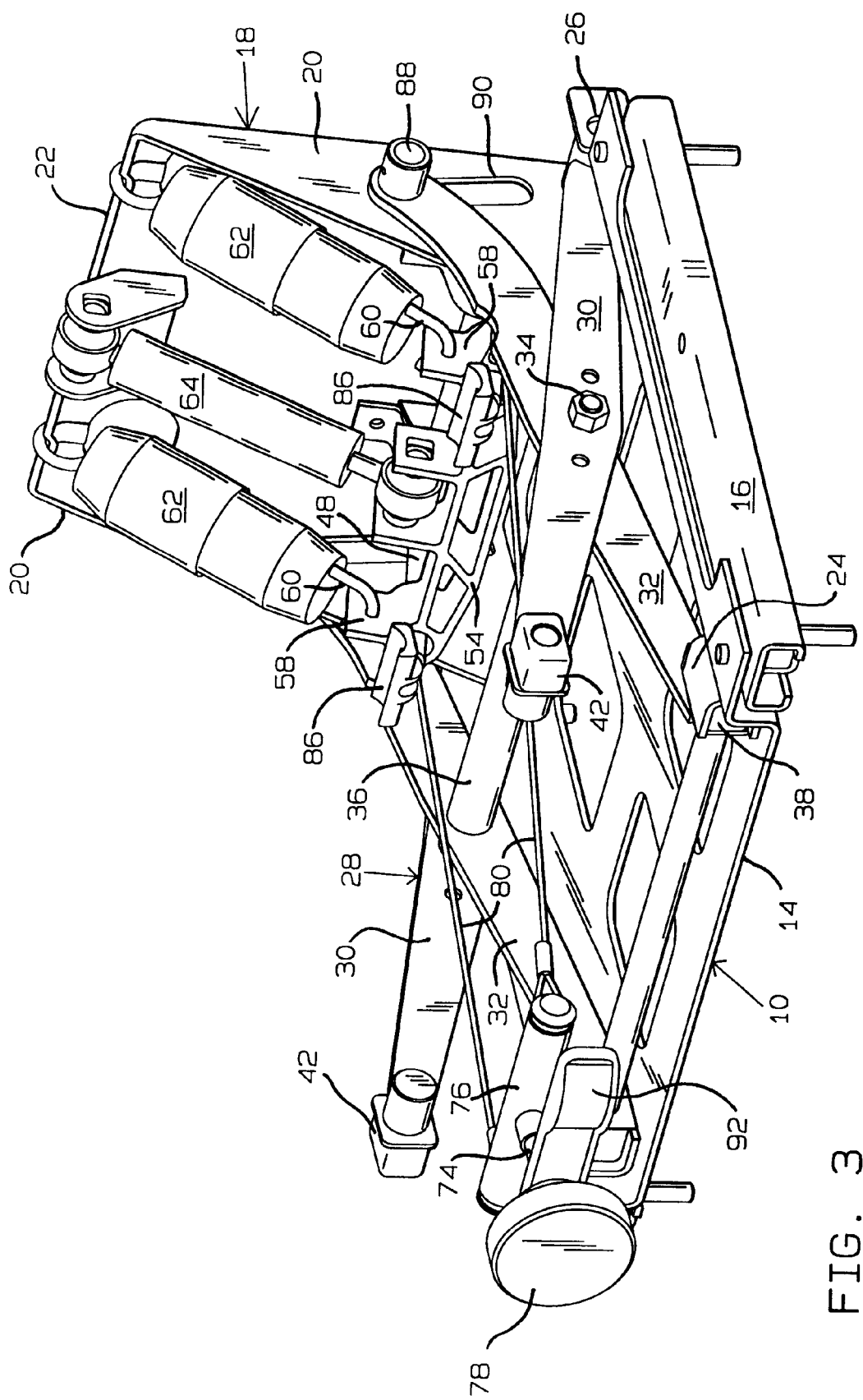
FIG. 3 is a perspective view of the seat structure, scissors linkage and spring means prior to the assembly thereof with the seat frame.

The base plate 14 includes a spring support 18, FIG. 3, extending upwardly from the rear of plate 14, and the spring support 18 includes shaped sides 20 and an upper region 22. Channel shaped guides 24 are affixed to the front end of the configured base plate 14, and at its rear edge, the base plate is provided with pivot holes 26 for cooperation with the scissors linkage as later described.

A scissors linkage 28 is mounted upon the base structure. The scissors linkage, as will be appreciated from the drawings, includes a pair of pivotally connected links defining a set, each set including an outer link 30 and an inner link 32. The linkage pivot 34 extends between the link sets and is preferably located within a tube 36.

The lower ends of the inner links 32 is provided with a follower, each of which is mounted within a base guide 24 for close sliding movements therein. The lower end of each of the outer links 30 is pivotally mounted to the rear of the base plate 14 by a pivot located in hole 26. The upper end of the outer links 30 is provided with a follower 42 for cooperating with seat structure as later described.

Figure 4:
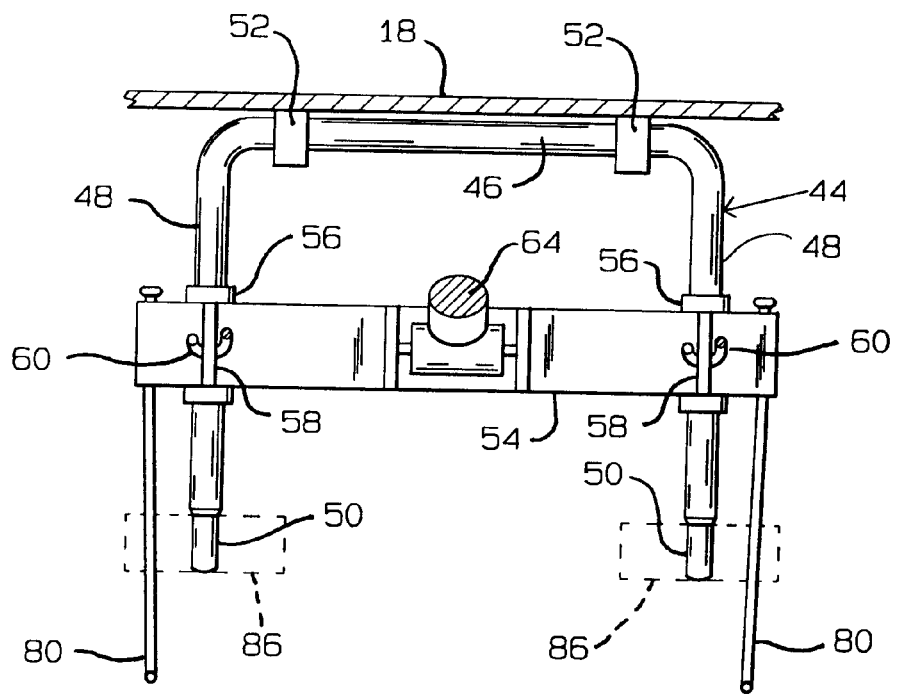
FIG. 4 is a detail plan view, partially sectioned, illustrating the lever and slide mechanism.
Figure 5:
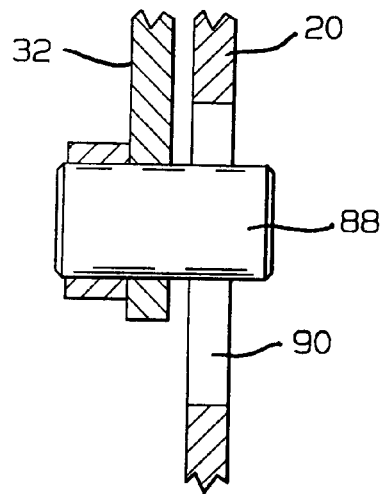
FIG. 5 is a detail enlarged sectional view as taken along Section 5—5 of FIG. 2.

A lever 44, FIG. 4, is pivotally mounted upon the spring support 18. The lever 44 is of a U-configuration including a base 46 having a pair of parallel cylindrical arms 48 extending therefrom terminating at end regions 50. Bearings 52 pivotally mount the lever 44 on the spring support 18 wherein the lever 44 pivots about the axis defined by the base 46.

A slide 54 is slidably mounted upon the arms 48 by bearings 56 wherein the bearings permit the slide 54 to slide on the arms 48 between the base 46 and ends 50. The slide 54 includes a pair of spaced anchor bosses 58 located in vertical alignment with the arms 48, and a pair of springs 60 are connected to the slide anchor bosses 58 and the upper region 22 of the spring support 18 as will be appreciated from FIG. 3. Preferably, the springs 60 are encased within telescoping spring covers 62. A shock absorber or damper cylinder 64 is pivotally connected to anchors defined on the slide 54 and the upper region 22 of the spring support 18 to dampen the pivoting of the lever 44 during suspension movement.

The seat frame 12 includes a U-shaped element 66 having a cross member 68. Hinge brackets 70 located at the rear ends of the element 66 pivotally support the seat back frame 72, and adjusting structure may be mounted upon the brackets 70 to permit the angular relationship of the seat back frame 72 to be adjusted relative to the seat element 66.

An adjustment screw 74 is rotatably mounted within the base of the seat frame element 66, and a cable bar 76 is threaded upon the screw 74 which is rotatable by the exteriorly accessible knob 78. A pair of flexible cables or tension members 80 are connected at one end to the bar 76, and at the other end to the slide 54. Rotation of the knob 78 rotates the screw 74 to adjust the tension within the cables 80 which will position the slide 54 on the lever arms 48. As the cables 80 are tensioned, the slide 54 is moved toward the lever arm ends 50, while the biasing force imposed on the slide 54 by the springs 60 tends to pull the slide rearwardly toward the lever base 46. The similarity of this adjusting structure to that disclosed in U.S. Pat. No. 5,601,338 will be appreciated by one skilled in the art.

A pair of elongated pockets 82 are affixed to the seat element 66 adjacent the front edge thereof, and the followers 42 mounted upon the upper ends of the outer linkages 30 are received within the pockets 82. The rectangular configuration of the followers 42 is guided by the relatively close fit with the pockets 82, which is a slidable arrangement in that the followers 42 are pivotally mounted.

Figure 1:
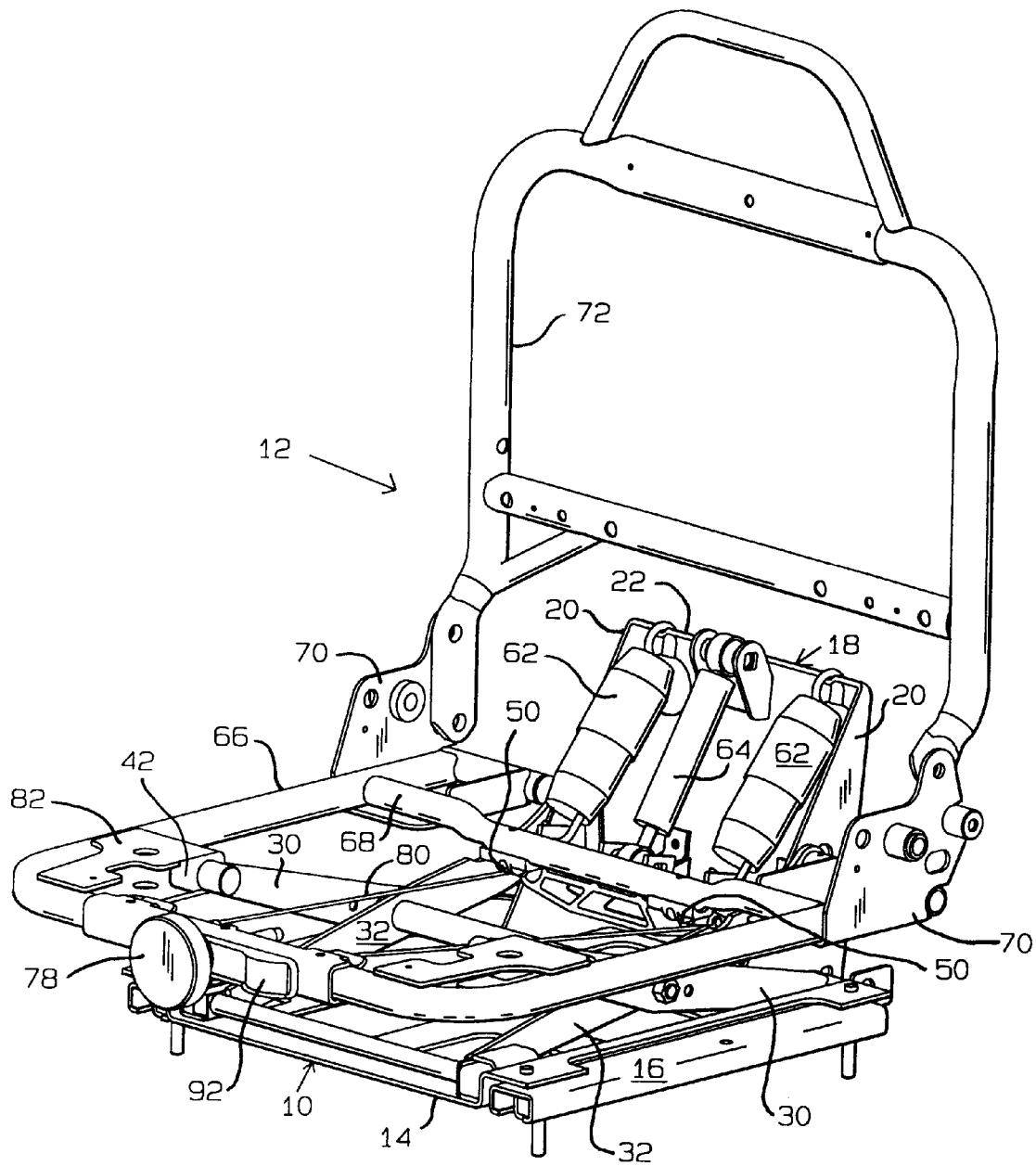
FIG. 1 is a perspective view of a full seat adjustable suspension in accord with the invention, the seat frame structure being illustrated as connected to the scissors linkage.
Figure 2:
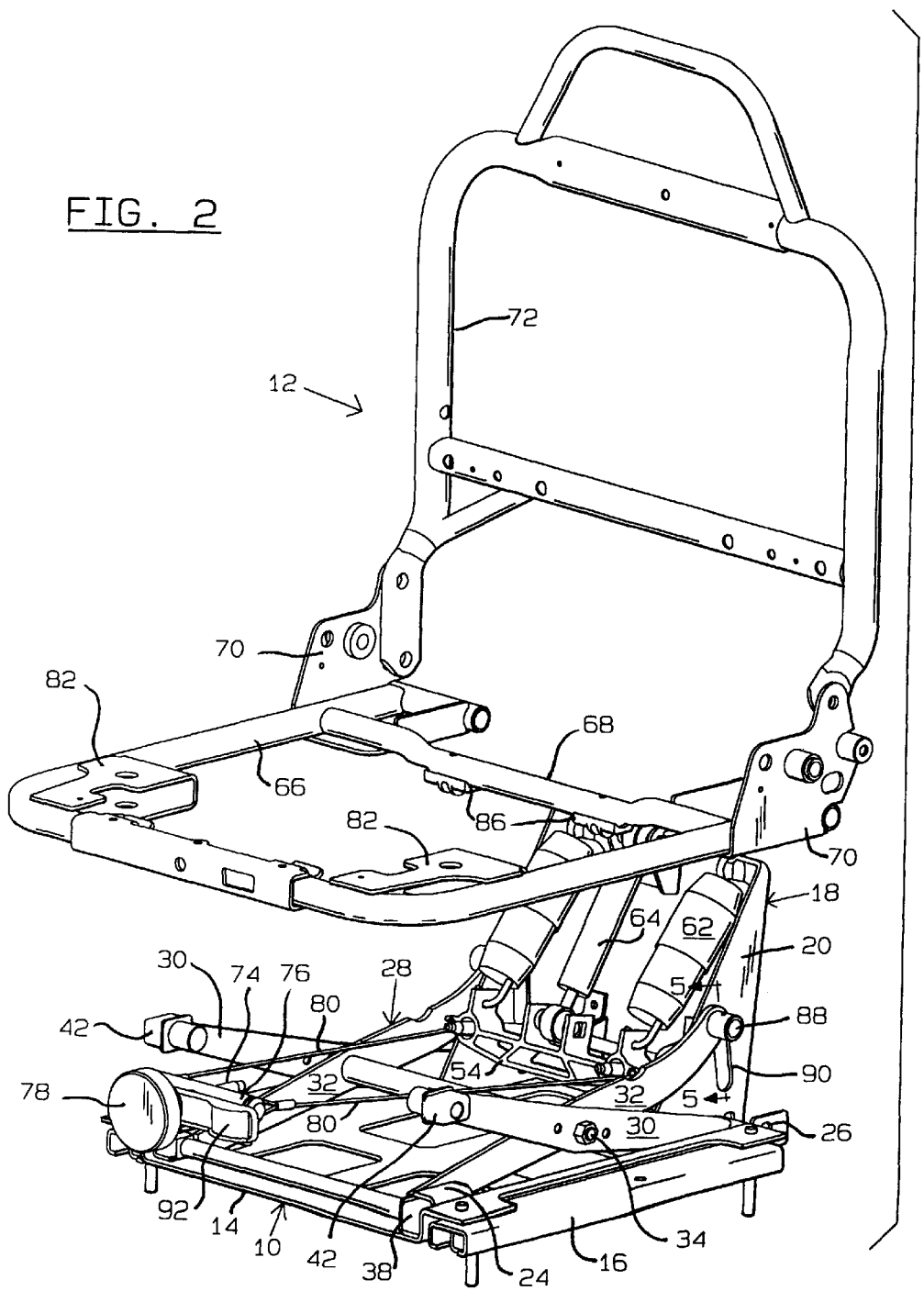
FIG. 2 is an exploded perspective view of a seat in accord with the invention illustrating the base structure and scissors linkage subassemblies prior to mounting of the seat frame thereon.

A pair of pads 86, FIG. 2, are mounted upon the underside of the seat element cross member 68, and the pads 86 include concave seating surfaces for receiving the lever arm ends 50. In this manner, the upward biasing forces imposed upon the lever 44 tending to raise the arms 48 is imposed upon the pads 86 providing resilient support for the seat frame 12.

The rear ends of the inner scissors links 32 are provided with a stud 88 having an inwardly extending portion received within a curved slot 90 defined within the sides 20 of the spring support 18. This relationship permits the studs 88 to slide within the associated slot 90 during upward and downward movement of the seat 12 as the spring linkage 28 pivots. However, because of the interrelationship of the studs 88 and slots 90, a high strength connection between the scissors linkage 28 and the base plate 14 is produced which permits safety seat belts to be directly attached to the seat structure and meet compliance with federal safety standards, and no separate extension of the seat belts to the vehicle floor or other anchors is required.

Upholstered cushions, not shown, are mounted upon the seat frame 12. The bottom seat cushion resting upon the seat element 66 may be integral with the cushion engaging the seat back frame 72, or separate cushions may be utilized. The particular construction of the cushions constitutes no part of the present invention.

The position of the slide 54 upon the lever arms 48 is indicated by indicator 92 mounted adjacent knob 78 which senses the position of the cable bar 76. This type of indicator is illustrated in U.S. Pat. No. 5,601,338, and permits the position of the slide 54 on the lever arms 48 to be accurately located to provide optimum suspension and comfort performance.

The support of the seat frame 12 upon the scissors linkage 28 permits the seat frame to move up and down in a substantially linear vertical movement. The weight imposed upon the seat frame 12 by the occupant is supported by the biasing force applied to the lever arms 48 by the springs 60 and, hence, the vertical movement of the seat frame 12 is suspended by the springs 60, and damped by dampers 64 to provide driver comfort. The closer that the slide 54 is moved toward the lever ends 50, the greater the biasing force imposed upon the arms 48, and the greater the weight that can be effectively supported and sprung by the springs 60. The heavier the occupant, the closer the slide 54 is moved toward the lever ends 50, while a lighter occupant is best accommodated by permitting the slide 54 to be moved toward the lever base 46.

It will be appreciated that the invention permits both the seat bottom cushion and back cushion to be vertically moved in unison for driver comfort and the linear movement of the seat frame also contributes to the comfort of the occupant.

It is appreciated that various modifications to the inventive concepts may be apparent to those skilled in the art without departing from the spirit and scope of the invention.

What is claimed is:

1. A full seat adjustable suspension comprising, in combination, base structure, a pivotal linkage movably mounted on said base structure capable of vertical movement, a seat frame having both seat bottom and seat back structure mounted upon said linkage for vertical movement therewith, spring means mounted on said base structure imposing an upward biasing force on said seat frame, and spring force adjusting means located between said spring means and said seat frame adjusting the degree of said biasing force.

2. In the full seat adjustable suspension as in claim 1, said pivotal linkage comprises a scissors linkage.

3. In the full seat adjustable suspension as in claim 1, said spring force adjusting means comprising a lever pivotally mounted on said base structure having a pivot axis, a spring slide movably mounted upon said lever selectively movable toward and away from said lever pivot axis, said spring means being connected to said slide whereby the spring biasing force is imposed upon said lever, said lever engaging said seat frame for imposing said upward biasing force thereon, and said spring force adjusting means comprising slide adjustment means operatively connected to said lever for selectively positioning said slide upon said lever.

4. In the full seat adjustable suspension as in claim 3, said lever being of a U configuration having a base and spaced parallel arms each having a free end, bearing means pivotally supporting said lever base upon said base structure, said slide being slidably mounted upon said arms between said base and arms' free ends, said arms' free ends engaging said seat frame biasing said seat frame and scissors linkage upwardly.

5. In the full seat adjustable suspension as in claim 3 wherein said slide adjustment means includes a rotatable screw mounted on said seat frame and flexible tension cables operatively connecting said screw to said slide.

6. A full seat adjustable suspension comprising, in combination, a base structure including substantially horizontal rails and an upwardly extending spring bracket having an upper region, a scissors linkage having lower pivots attached to said rails, lower guides guided by said rails and upper guides, a seat frame having both seat bottom and seat back structure and having pockets slidably receiving said linkage's upper guides, a lever structure having a pivot end pivotally mounted on said base structure and having a free end engaging said seat frame at a location spaced from said pockets, a slide movably mounted on said lever between said pivot and free ends, extension spring means interposed between said spring bracket upper end and said slide, and adjustment means mounted upon said seat frame operatively connected to said slide selectively positioning said slide upon said lever structure.

7. In the full seat adjustable suspension as in claim 6, said lever structure being of a U configuration having a base pivotally attached to said base structure and spaced parallel arms each having a free end.

8. In the full seat adjustable suspension as in claim 7, said extension spring means comprising a pair of extension springs, each spring being in substantially vertical alignment with a lever structure arm.

9. In the full seat adjustable suspension as in claim 6, vertical extending slots defined in said spring bracket, said scissors' linkages including pivots extending into said slots to restrict horizontal movement of said scissors' linkages.

* * * * *